(No Model.)
9 Sheets—Sheet 1.

J. W. SCULL.
BOOK STAPLING MACHINE.

No. 402,984. Patented May 7, 1889.

Fig. 1.

Witnesses:
Jas. E. Hutchinson.
Henry C. Hazard.

Inventor:
John W. Scull, by
Crindle and Russell, his Atty (No Model.) 9 Sheets—Sheet 6.
J. W. SCULL.
BOOK STAPLING MACHINE.

No. 402,984. Patented May 7, 1889.

Fig. 6

(No Model.) 9 Sheets—Sheet 8.

J. W. SCULL.
BOOK STAPLING MACHINE.

No. 402,984. Patented May 7, 1889.

Fig. 8.

Witnesses:
Jas. E. Hutchinson
Henry C. Hazard

Inventor:
John W. Scull, by
Crindle and Russell, his Attys (No Model.) 9 Sheets—Sheet 9.

J. W. SCULL.
BOOK STAPLING MACHINE.

No. 402,984. Patented May 7, 1889.

Witnesses:
Jas. E. Hutchinson
Henry C. Hazard

Inventor.
John W. Scull, by
Grindle and Russell, his Attys

UNITED STATES PATENT OFFICE.

JOHN W. SCULL, OF PHILADELPHIA, PENNSYLVANIA, ASSIGNOR OF ONE-HALF TO ANDREW SCULL, OF SAME PLACE; ANDREW SCULL ADMINISTRATOR OF SAID JOHN W. SCULL, DECEASED.

BOOK-STAPLING MACHINE.

SPECIFICATION forming part of Letters Patent No. 402,984, dated May 7, 1889.

Application filed July 30, 1887. Serial No. 245,719. (No model.)

*To all whom it may concern:*

Be it known that I, JOHN W. SCULL, of Philadelphia, in the county of Philadelphia, and in the State of Pennsylvania, have invented certain new and useful Improvements in Book-Stapling Machines; and I do hereby declare that the following is a full, clear, and exact description thereof, reference being had to the accompanying drawings, in which—

Fig. 3 is a front elevation of said machine.

Letters of like name and kind refer to like parts in each of the figures.

The design of my invention is to enable the leaves of a pamphlet to be secured together by means of two or more simultaneously-driven staples; and to this end my invention consists in the construction and combination of parts whereby two or more staples may be simultaneously formed and a like number simultaneously driven, substantially as and for the purpose hereinafter specified.

In the carrying of my invention into practice I employ a bed, A, which has the general form shown in Figs. 1 to 4, and is supported upon legs B and B, like the bed of a lathe.

Resting upon the upper side of the bed A and secured by gibs to the projecting V-shaped bearings $a$ and $a$, that are provided at each side edge of the same, are two tables, C and C, that are adapted to be moved lengthwise of said bed like the slide-rest of a lathe, and are so moved in relatively-opposite directions by means of a threaded shaft, D, which is journaled within the rear upper portion of said bed, is adapted to be rotated at will by means of a hand-wheel, $d$, upon one of its projecting ends, and is provided with oppositely-pitched threads $d'$ and $d'$, that each engage with a correspondingly-threaded nut, $c$, which is formed in the rear portion of each table, the construction being such as to cause said tables to be simultaneously moved toward or from each other by the rotation of said shaft.

Figure 1:
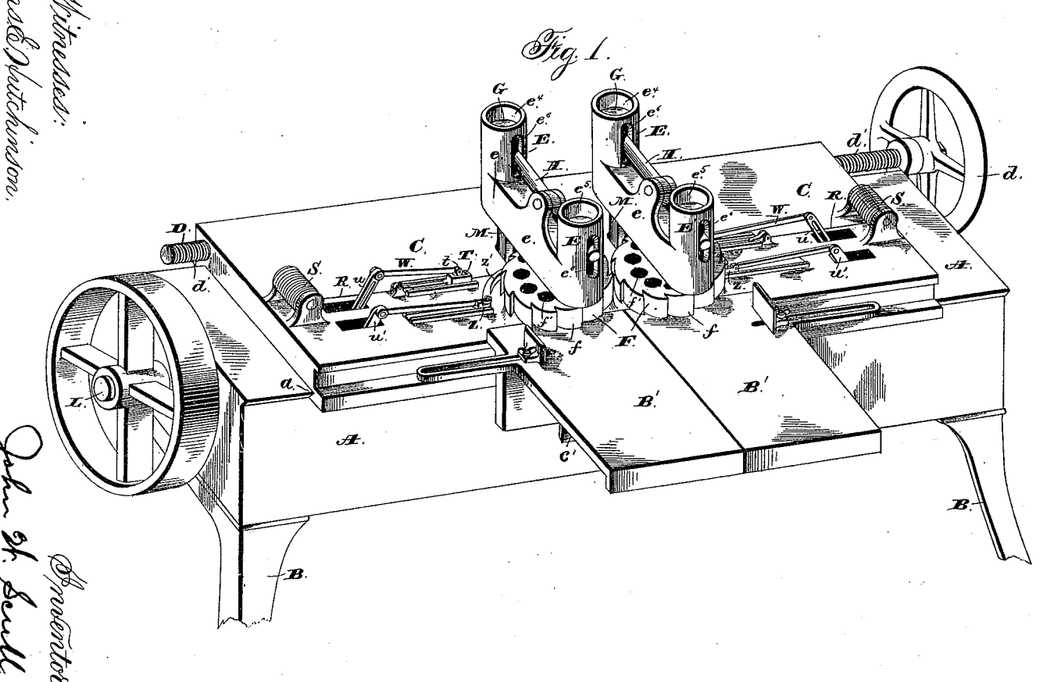
Figure 1 is a perspective view of my machine from the upper front side.
Figure 2:
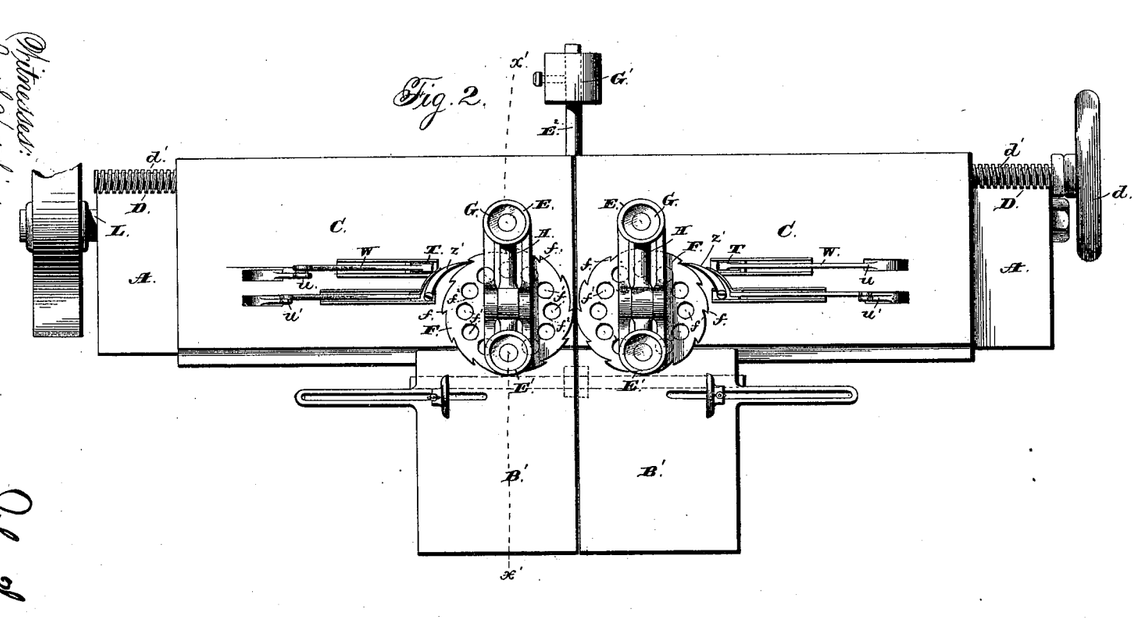
Fig. 2 is a plan view of the upper side of the same.
Figure 4:
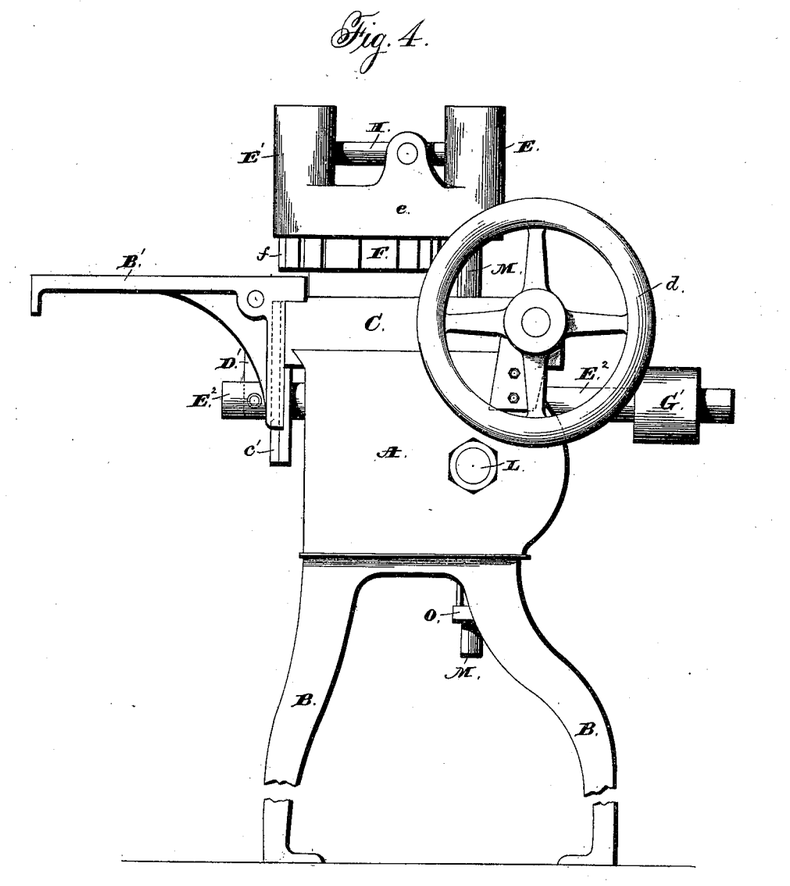
Fig. 4 is an end elevation of the same.
Figure 5:
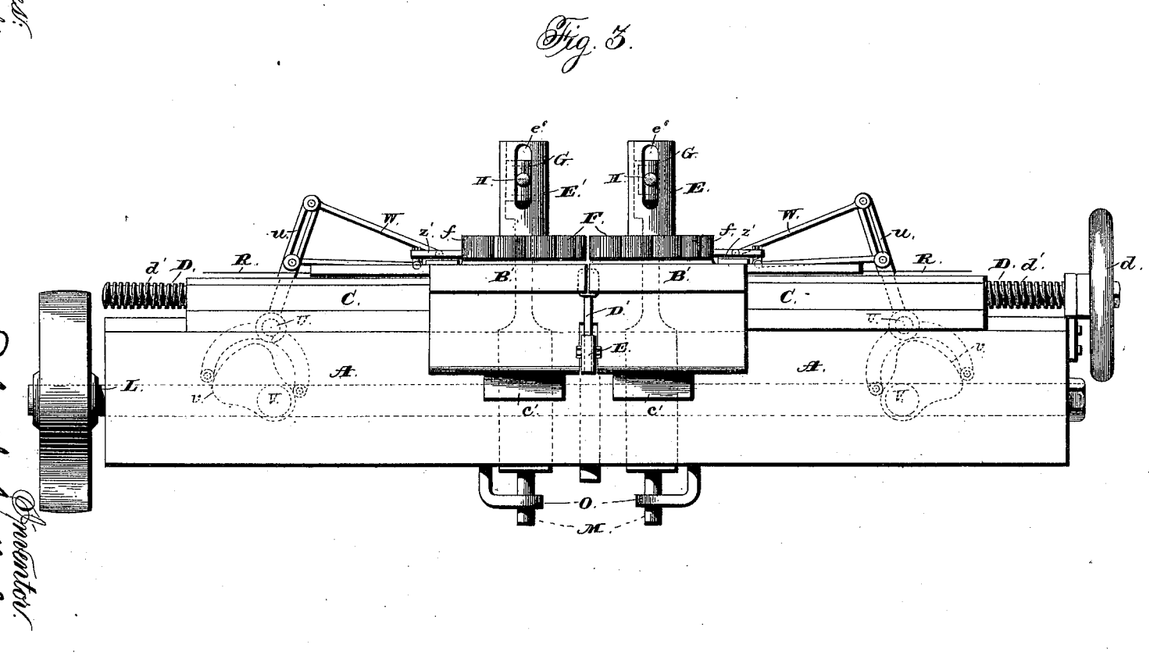
Fig. 5 is an enlarged view, partly in plan and partly in horizontal section, of one end of the machine.
Figure 6:
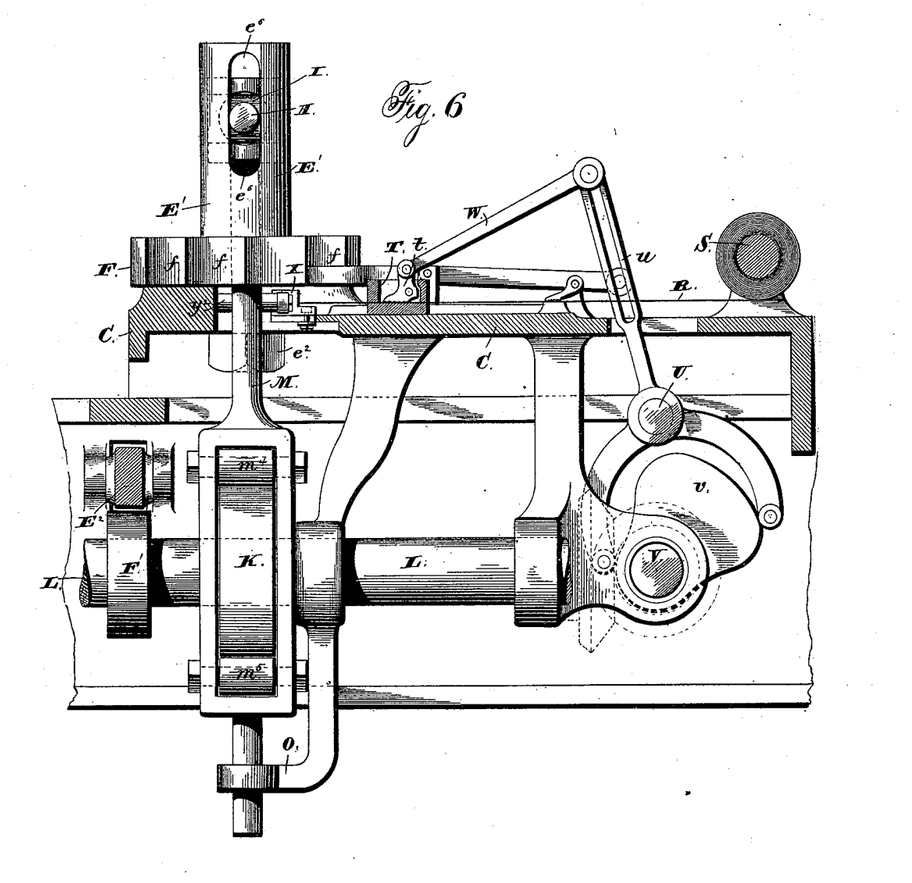
Fig. 6 is a vertical section upon line $x\,x$ of Fig. 5.
Figure 7:
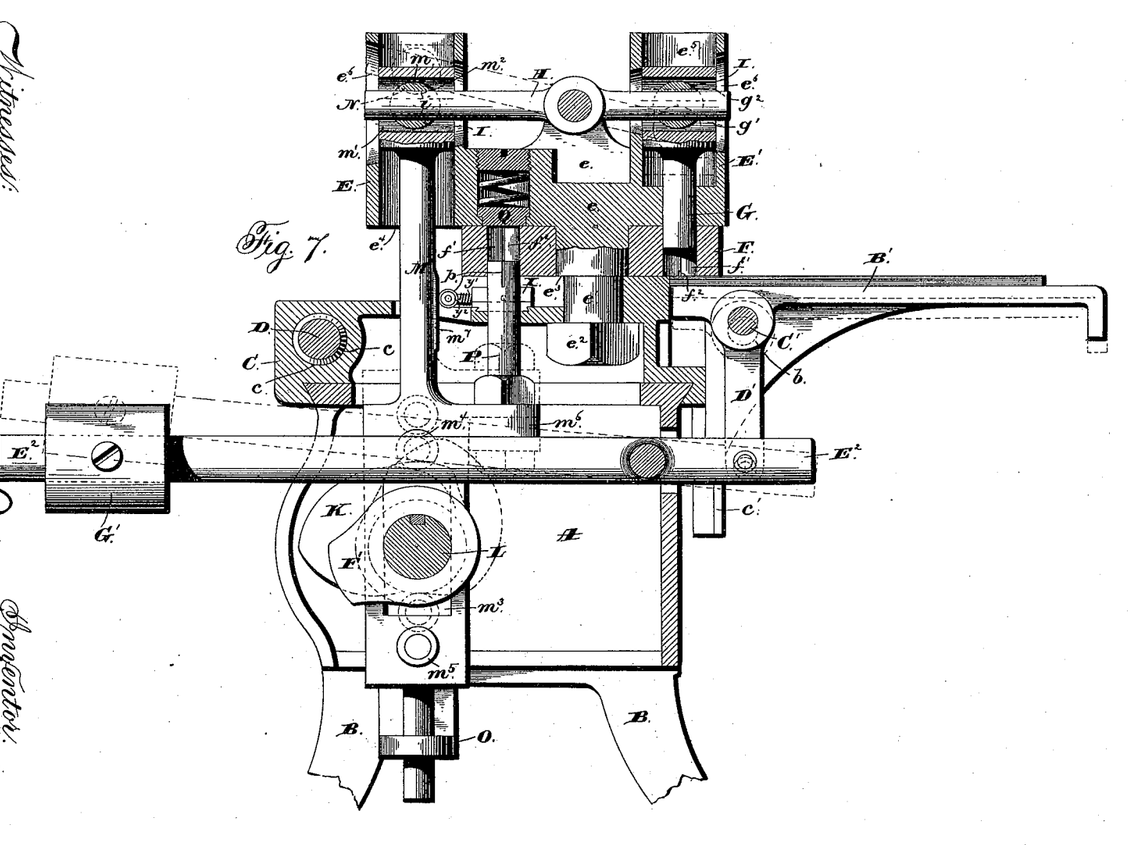
Fig. 7 is a like view upon line $x'\,x'$ of Fig. 2.
Figure 8:
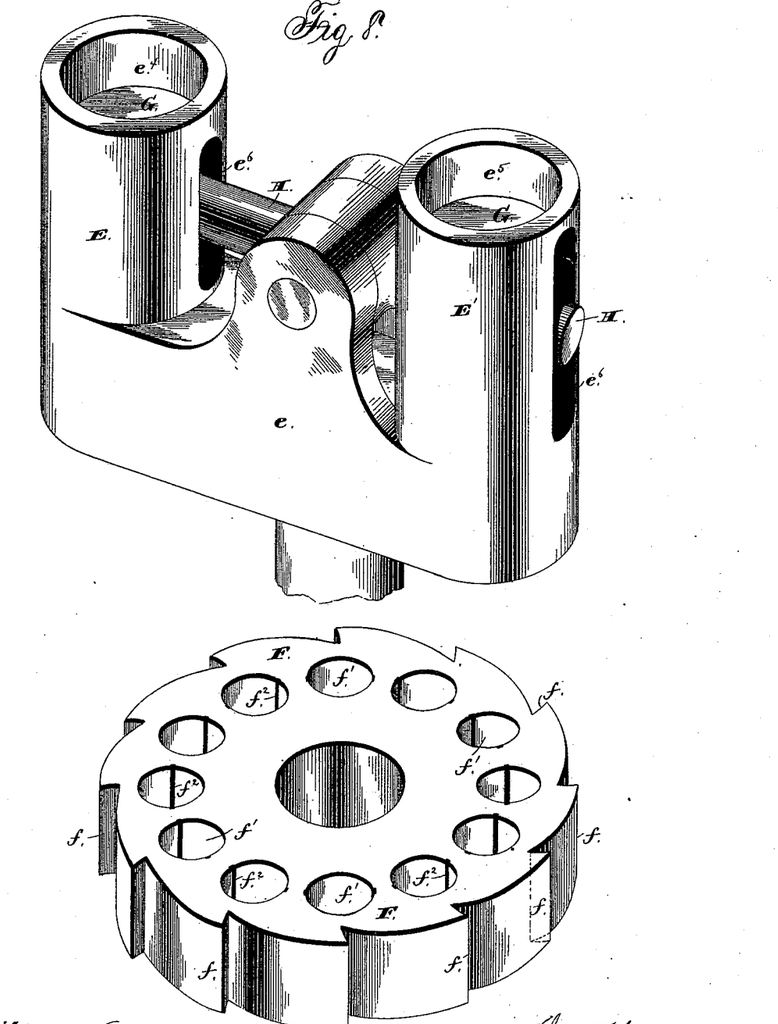
Fig. 8 is an enlarged perspective view of one of the heads and of one of the rotatable staple-holders separated from each other and from the machine.

Near the inner end, upon the upper side of each table C, is a head, which, as shown in Fig. 8, is composed of two hollow cylindrical housings, E and E', that are arranged vertically and connected by means of a central portion or body, $e$. From a point at one side of the center of said body a bolt, $e'$, projects downward into and through a corresponding opening in the table, and upon its lower threaded end is provided with a nut, $e^2$, that operates to confine said bolt in place. A shoulder, $e^3$, upon said bolt bears against the upper side of said table and operates to support said head in an elevated position, as seen in Fig. 7.

Journaled upon the bolt $e'$, between the lower side of the head and the upper side of the table C, is a disk, F, which has such diameter as to cause its periphery to extend to or near the outer side of the front housing, E', and upon such periphery is provided with ratchet-teeth $f$ and $f$. Said disk has such thickness as to cause it to substantially fill the space vertically between said head and table, and at equidistant points is provided with round vertical openings $f'$ and $f'$, that have such radial positions as to cause each, when moved into position beneath said housing E', to coincide axially with the opening in the same.

The rear housing, E, is provided with a plain cylindrical opening, $e^4$, which extends entirely through the same, while the front housing, E', has a similar opening, $e^5$, that extends from its upper end nearly to its lower end, and from thence downward is reduced to and exactly corresponds in diameter to the diameter of each of the openings $f'$ of the disk F. Said housing contains a plunger, G, the upper portion of which corresponds to and loosely fills the upper larger portion of the opening $e^5$, while its lower portion, $g$, is reduced until it will pass freely into the lower smaller portion of said opening and into the coinciding opening $f'$ of said disk.

In order that the plunger G may be moved vertically, there is pivoted horizontally within a suitable bearing upon the central part, $e$, of the head $a$ round bar, H, which has such length as to cause its ends to project through vertically-elongated slots $e^6$ in the housings E and E' to the outer sides of said housings. Within the upper larger portion of said plunger is provided a horizontal opening, $g'$, which is adapted to receive the end of said bar, and is elongated vertically like the slot $e^6$, while at a right angle to the same is provided a second horizontal opening, $g^2$, that is round and receives a cylindrical block, I. Said block is somewhat greater in diameter than said bar H, and has a transverse opening, $i$, which is adapted to receive the end of the latter. As thus arranged, the vertical oscillation of the pivoted bar H will cause the plunger G to be moved vertically, during which operation the portion of said bar which is contained within the opening $i$ of the block I slides longitudinally through the same, while said block is partially rotated in opposite directions within the plunger, and forms a rolling bearing between the latter and said bar.

The bar H is oscillated upon its bearings at certain predetermined times by means of a cam, K, which is secured upon and rotates with a shaft, L, that is journaled within and extends lengthwise of the bed A. The movements of said cam are communicated to said bar H by means of a bar, M, that extends between said parts, and at its upper end is provided with a head, $m$, which corresponds to and is a duplicate of the upper portion of the plunger G, being provided with an elongated opening, $m'$, for the reception of the end of said bar H and a round transverse opening, $m^2$, that contains a block, N, through which the end of said bar passes.

The lower portion of the bar M has such width as to enable it to span the shaft L, for which purpose it is provided with a longitudinal slot, $m^3$, while below said shaft said bar is reduced in diameter and passes through a guide, O, that is secured to and moves with the table C. The cam K is located adjacent to one face of said bar M, and at suitable points above and below the slot $m^3$ there are journaled upon the latter two rollers, $m^4$ and $m^5$, which are engaged by said cam and operate to communicate the motion of the latter to said bar.

The office of the disk F is to assist in the formation of wire staples to hold the staples when formed and to carry them successively beneath the plunger G, by which they are driven into the sheets of paper that are to be secured together. For such purpose each of the openings $f'$ is provided within opposite sides with vertical grooves $f^2$, that have such horizontal dimensions as to adapt each to receive and contain the wire from which such staples are to be made.

Each staple is driven from its opening $f'$ when such opening by the rotation of the disk F is directly beneath the plunger G, while said staples are formed at a point directly opposite to said plunger by means of a cylindrical former, P, that projects upward from an arm, $m^6$, that extends horizontally forward from the bar M, the arrangement being such as to bring said former directly in line with the rear opening, $f'$, of said disk, while its dimensions are such as to cause it to loosely fill said opening. When the plunger G is at the upper limit of its motion, the upper end of the former P is just below the lower face of the disk F, so that if a wire blank is placed across the end of said former the upward movement of the cam-bar M necessary for the moving of said plunger downward will cause said blank to be forced upward into the coinciding opening $f'$ and by such movement to be bent into the requisite staple form, its sides being contained within the grooves $f^2$ and $f^2$, where their outward spring will cause them to remain when said former is withdrawn.

The upper end and sides of the former P are preferably provided with a groove, $p$, that coincides with the grooves $f^2$ $f^2$ of the opening $f'$, which groove operates as a guide for the wire blank as each staple is formed, while in order to prevent injury to the parts should the wire have too large a diameter there is provided within the head immediately above the disk F a spring-backed anvil, Q, which receives the upward pressure of the finished staple and yields if the pressure is too great.

Wire R, for forming staples, is contained on a reel, S, which is preferably journaled upon a suitable support at the outer end of the table C, and from thence extends in a direct line to and across the upper end of the former P. Said wire is fed forward at predetermined times by means of a device which is composed mainly of a block, T, that is adapted to be moved back and forth upon a suitable track or ways by a rock-shaft, U, which is journaled within the bed A, is actuated by a cam, $v$, upon a transverse shaft, V, and has a longitudinally-slotted arm, $u$, that is connected with said block by means of a bar, W, which extends between the same. Instead of being pivoted directly to the said block T, the end of said bar is pivoted upon one arm of an L-shaped piece, $t$, which resembles an ordinary bell-crank, is pivoted at the intersection of its arms to said block, and by a forward pressure of said connecting-bar upon the upper end of its vertical arm has the outer end of its horizontal arm pressed downward upon the wire R, which wire passes through a groove in said block directly beneath said clamping-piece.

As arranged it will be seen that when the rock-shaft turns so as to move the feeding block or slide toward the staple-forming mechanism the first effect is to cause the clamping-piece to "bite" said wire and compel it to move in the same direction, while upon the return movement of said slide said clamping-piece is released from engagement with said wire and passes freely rearward over the same. By changing the point of pivotal attachment of the connecting-bar with the arm of the rock-shaft the throw of the feeding-slide may be varied, so as to increase or diminish the forward movement of the wire.

Figure 9:
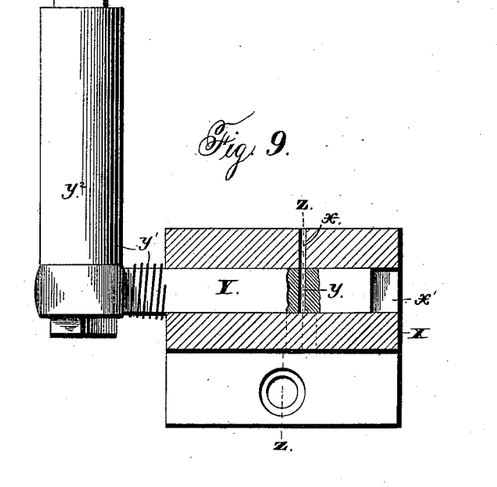
Fig. 9 is an enlarged plan view, partly in section, of the wire-cutting mechanism.
Figure 10:
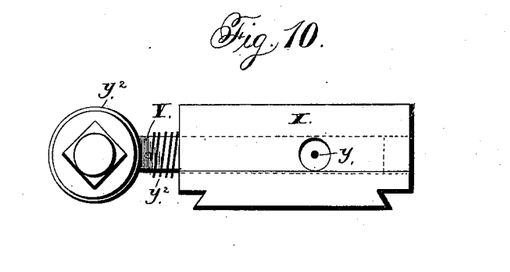
Fig. 10 is an end elevation of the same.
Figure 11:
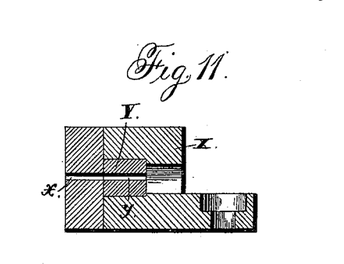
Fig. 11 is a vertical section upon line $z\,z$ of Fig. 9.

In front of the former P is located a block, X, which is provided with an opening, $x$, that receives and permits of the passage of the wire R. Passing horizontally through said block in a direction having a right angle to the line of said opening $x$ is a second larger intersecting opening, $x'$, in which is fitted a correspondingly-shaped bar, Y, that is adapted to slide longitudinally through the same, and is provided with an opening, $y$, which coincides with but is considerably larger than said opening $x$. Said sliding bar is held with a yielding pressure at one limit of its motion by means of a spring, $y'$, and is moved to the opposite limit by means of a cam-face, $m^2$, which is formed upon the front side of the bar M and engages with the outer end of said bar Y, or with a roller, $y^2$, that is pivoted upon and extends laterally from the same.

The action of the slide-bar Y when moving forward is to cut the wire at the point where it enters the opening $x'$, and its movements are so timed that such operation occurs immediately after the feeding mechanism ceases to act. The part cut from the wire constitutes a staple-blank, and its length is determined by the distance to which the wire is fed forward and the point with relation to the staple-former at which the cutting mechanism is set, said mechanism being adjustable within certain limits.

The disk F is automatically rotated a distance equal to the space between two of its openings $f'$ at each rotation of the driving-shaft by means of an arm, $u'$, which extends upward from the rock-shaft U, a sliding block, Z, that is adapted to be moved horizontally toward or from said disk and carries a pawl, $z'$, which is adapted to engage with the teeth $f$ of the same, and a rod, $w$, that is pivoted to and extends between said sliding block and rock-shaft arm.

The parts described as connected with the table C are duplicated upon the other table, so that two stapling operations are simultaneously carried on. By means of said mechanism the wires are simultaneously fed forward, two blanks then cut off, the blanks then formed into staples by being pressed upward into the rear disk-openings, and the disks then partially rotated, so as to bring other openings into position to receive staples, such operations being automatically repeated as long as the machine is run. After a sufficient number of staples have been formed, so that the front openings of the disks are supplied, the operation of stapling books may be commenced, for which purpose the following-described additional mechanism is required.

Upon the front side of each table C is formed an ordinary V-shaped way, $c'$, upon which is fitted a bracket, B', that is adapted to be moved vertically thereon and has such width of horizontal top as, in connection with the bracket B' of the opposite table, to furnish a sufficient support for the work to be operated upon. Said brackets are connected together vertically, while free to be moved laterally, by means of a rod, C', which passes through a boss, $b$, that is provided at the inner end near the rear side of each bracket. Said rod passes through and is secured centrally in the upper end of a bar, D', the lower end of which is pivoted within one end of a second bar, E², which latter bar is in turn pivoted near said end within the frame of the machine, and from thence extends horizontally rearward over a cam, F', that is secured upon and rotates with the shaft L. As thus arranged, it will be seen that by a movement of the bar E² upon its pivotal bearing the brackets B' and B' will be moved vertically, and in order that their weight may be overbalanced and an upward pressure caused said bar is preferably extended beyond the rear side of the machine, and upon such end is secured a weight, G'. If desired, a spring may be employed in place of the weight. The cam F' engages with the lower side of the bar or lever E² and operates to raise the rear end of the same, so as to depress the brackets B' and B' at each revolution of the shaft L, when, by the action of the weight or spring, said brackets will be returned to their upper position.

The mechanism is now complete, and operates as follows, viz: The machinery being started and the bracket-supports depressed, a pamphlet is placed upon the latter, after which said brackets rise and firmly clamp said pamphlet between their upper faces and the lower sides of the projecting portions of the staple-disks. The plungers now descend and simultaneously force through the paper two of the previously-formed staples, after which said plungers rise. Said disks are rotated to position for another operation, and said brackets are again moved downward, so as to release the stapled pamphlet and permit of its removal and replacement by another. While each pair of staples is being driven to place another pair is simultaneously formed, so that the operation of stapling may be continued indefinitely without other attention than such as is required for placing in and removing from position the pamphlets being operated upon.

Should a staple become bent, so as to fail of piercing the paper, the weight-supported brackets will be simply pressed downward and all injury avoided. Such means for causing upward pressure also enables pamphlets having different thicknesses to be operated upon without change of the machine.

From the foregoing it will be apparent that the sliding blocks T and the clamping pieces or levers $t$ carried thereby constitute wire or blank feeders; that the sliding bars Y, operating in connection with the blocks X, serve as wire-cutters for severing the wire into blanks; that the disks F, with their openings, serve as magazines for storing the staples forced into said openings by the staple-formers P and as carriers and holders for bringing the formed staples into setting positions, and that the vertically-reciprocating plungers G serve as drivers for setting the staples, and that these several devices operate successively to automatically form and set the staples.

While as constructed the machine described is adapted for driving but two staples at one time, it will be obvious that by increasing the number of staple forming and driving mechanisms pamphlets requiring any greater number of staples may be operated upon.

Having thus described my invention, what I claim is—

1. In a book-stapling machine, the combination, with two or more wire-feeders, two or more wire-cutters, and two or more staple-formers, of two or more staple holders and carriers and two or more staple-drivers, constructed and arranged to operate successively in the order named for simultaneously forming and setting two or more staples, substantially as and for the purpose shown.

2. In a book-stapling machine, the combination, with an intermittingly-rotating disk provided with a series of equidistant openings for the reception of staples, of a former for forcing a series of blanks into said openings in the shape of staples, and a driver for successively forcing said staples out of said openings and into a book, substantially as and for the purpose set forth.

3. As an improvement in mechanism for stapling books, the combination of a support for books which is adapted to hold a book upward with a yielding pressure and a staple-holding plate that is adapted to furnish a bearing for the upper side of the book, substantially as and for the purpose shown and described.

4. As a means for feeding wire to the blank-cutting devices, the combination of a block which is adapted to slide back and forth within or upon a track beneath the wire, an L-shaped dog that is pivoted within or upon said block, and a bar which has one of its ends pivoted to the vertical arm of said dog and its opposite end pivoted upon a reciprocating part of the machine, whereby when said parts are moved forward the horizontal arm of said dog is pressed downward upon and caused to engage with and move said wire forward, substantially as and for the purpose specified.

5. In combination with mechanism, substantially as shown, whereby wire is intermittingly fed from a reel, a stationary block which is provided with an opening for the passage of the wire and an intersecting opening that has a right angle thereto, and a cutter-bar that is adapted to slide longitudinally within the last-named opening and is provided with a wire-opening which by the motions of said cutter-bar is alternately moved into and out of coincidence with the wire-opening of said block, substantially as and for the purpose described.

6. The combination, with an intermittingly-rotating disk which is provided with a series of staple forming and holding openings, of a feeder for presenting blanks to said openings as they successively reach a predetermined position and a former which is adapted to be moved upward into the openings of said disk to form staples within the same for the interposed blanks, substantially as and for the purpose described.

7. In combination with a disk which is provided with equidistant staple-holding openings and by a step-by-step rotation is adapted to bring such openings successively over a book-supporting mechanism, a plunger that is adapted to be moved downward through each staple-containing opening as it reaches a predetermined point and to force the staple contained therein into a book placed beneath, substantially as and for the purpose shown.

In testimony that I claim the foregoing I have hereunto set my hand this 27th day of July, A. D. 1887.

JOHN W. SCULL.

Witnesses:
HENRY C. HAZARD,
GEO. S. PRINDLE.

It is hereby certified that Letters Patent No. 402,984, granted May 7, 1889, upon the application of John W. Scull, of Philadelphia, Pennsylvania, for an improvement in "Book-Stapling Machines," was erroneously issued to "Andrew Scull, as administrator, his successors or assigns, and Andrew Scull, his heirs or assigns;" that said Letters Patent should have been issued to *Andrew Scull, as executor, his successors or assigns, and Andrew Scull, his heirs or assigns;* and that the said Letters Patent should be read with this correction therein that the same may conform to the files and record of the case in the Patent Office.

Signed, countersigned, and sealed this 9th day of July, A. D. 1889.

[SEAL.]

CYRUS BUSSEY,

*Assistant Secretary of the Interior.*

Countersigned:

C. E. MITCHELL,

*Commissioner of Patents.*